Patented Mar. 30, 1954

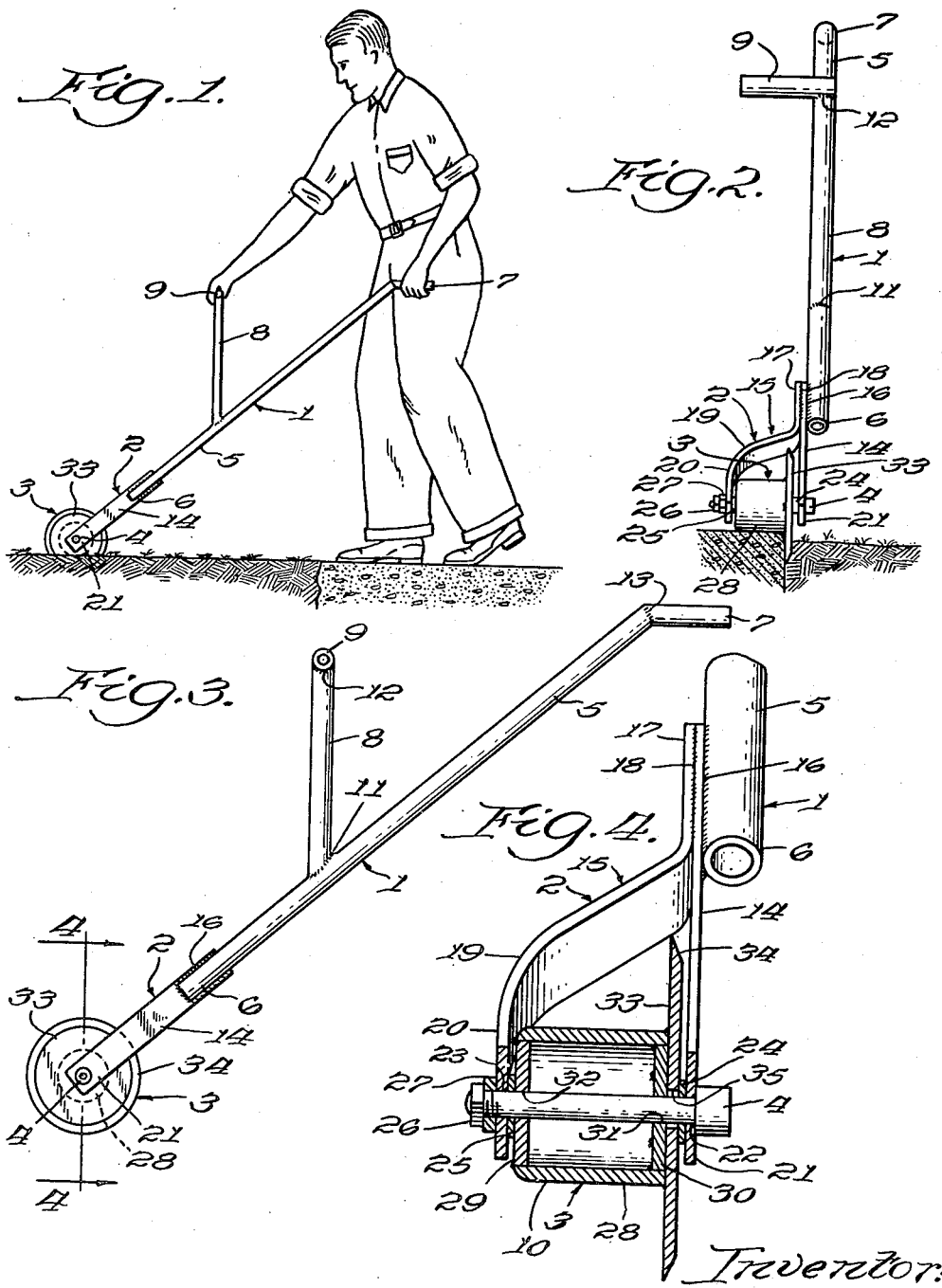

2,673,396

UNITED STATES PATENT OFFICE 2,673,396

LAWN EDGER

John J. Beres, Los Angeles, Calif.

Application October 15, 1951, Serial No. 251,287

2 Claims. (Cl. 30—292)

This invention relates to lawn edgers and more particularly to an improvement therein comprising a frame or handle construction better adapted for directional control of the combined roller and cutter component mounted thereon.

Heretofore, the common design for lawn edgers has comprised a disc-like cutter having either a continuous or serrated cutting edge and a walk engaging roller of lesser diameter attached thereto; the cutter and roller component being mounted for rotation at one end of a straight handle adapted to be grasped at one end and at about its mid length by the hands of the user to supply the forward and downward force to propel the device along the edge of the walk. This makes a tiresome and awkward position for the user and control of the direction as well as of the angle of the cutter is difficult in that such control is obtained by twisting the handle about its axis. Further, the common design of lawn edgers employs a roller of relatively narrow width which is difficult to maintain resting squarely on the walk to hold the cutter parallel to the side of the walk.

With the foregoing considerations in mind, it is an object of the present invention to provide a lawn edger characterized by a frame or handle construction designed for comfortable and efficient directional control of the wheel component and by a combined roller and wheel component designed to assist in maintaining the cutting element disposed at right angles to the surface of the walk.

With the foregoing object in view, together with such other objects and advantages as may subsequently appear, the invention resides in the parts, and in the construction, combination, and arrangement of parts disclosed, by way of example, in the following specification of one mode of execution of the invention; reference being also had to the accompanying drawings which form a part of said specification and in which drawings:

Fig. 1 is a side elevation of a lawn edger embodying the present invention; the edger being shown in use and a user being included in the figure to illustrate the advantageous and convenient operation flowing from the novel design of the frame component, Fig. 2 is an enlarged front elevation of the edger shown in Fig. 1, Fig. 3 is a side elevation as viewed from the right hand side of Fig. 2, and Fig. 4 is a further enlarged, fragmentary, sectional view taken on the line 4—4 of Fig. 3 showing details of the construction and mounting of the roller and cutting component of the invention.

Referring to the drawings, the illustrated embodiment of the invention includes a handle component 1 having a yoke shaped bearing component 2 affixed to the distal end of the handle component and a combined walk engaging roller and cutter component 3 freely rotatable on an axle bolt 4 carried by and extending between the free ends of the bearing component 2 (see Figs. 2 and 4). In the drawings, the device is shown in position of use on a horizontal surface and the relative positions of the component parts of the device will be described in terms relative to that position.

The handle component 1 comprises a main portion 5 which extends diagonally and rearwardly upward from its forward and distal end 6 to a level conveniently reached by the hand of a user and terminates in a horizontal hand grip portion 7. At a point about one-fourth of the length of the main portion 5 from the distal end 6, the handle component 1 has fixed thereto a vertical member 8 which terminates slightly below the horizontal plane of the handgrip 7 in a laterally extending hand grip portion 9 which extends to the same side of the main portion 5 as the walk engaging roller portion 10 of the roller and cutter component 3 as will be later referred to in more detail. The handle component may be conveniently formed from metal tubing welded together at 11, 12 and 13 as illustrated, but other modes of manufacture and other materials may be used; the main points to be observed being the location of the hand grip portions 7 and 9 for convenient holding in the hands of the user as shown in Fig. 1.

The bearing component 2 comprises a first member 14 and a second member 15; the member 14 having one end thereof welded at 16 to the distal end 6 of the handle component and extending beyond said distal end parallel to the longitudinal axial line of the main portion 5 of the handle component. The second member 15 of the bearing component 2 has a portion 17 extending parallel to the member 14 which is welded to the member 14 at the said one end thereof at 18 and thence extends in a diagonally outward and downward run 19 and terminates in a distal end portion 20 parallel to and laterally offset from the distal end 21 of the member 14 at the same side of the handle component as the hand grip 9 (see Fig. 2).

The distal ends of the members 14 and 15 are provided with aligned holes 22 and 23, respectively, through which the axle bolt 4 extends and mounted on the bolt between the members 14 and 15 is the roller and cutter component 3 with washers 24 and 25 interposed between the ends of the component 3 and the adjacent faces of the members 14 and 15 as best shown in Fig. 4. A pair of lock nuts 26 and 27 on the threaded end of the bolt completes the assembly and provides an adjustment whereby end play of the roller between the members 14 and 15 may be eliminated.

The disclosed embodiment of the roller and cutter component 3 comprises a roller formed of a short length of metal tubing 28 having end members 29 and 30 welded therein; said end members having aligned, centrally disposed holes 31 and 32 formed therein for reception of the axle bolt 4, and a cutter 33 formed of a disc of tool steel provided with a peripheral sharpened edge 34 attached by welding to one end face of the roller; said cutter having a centrally disposed hole 35 somewhat larger than the holes 31 and 32 disposed in alignment with said holes so that contact between the cutter and the axle bolt is avoided. If desired, the roller may be provided with an exterior surface of rubber or the like to further insure rolling contact with the walk.

As before described, the roller is positioned in alignment with the hand grip 9 and as shown in Fig. 2, the roller extends laterally from the side of the cutter disc for a distance which is substantially equal to the length of the hand grip 9. It will be evident that the user, by exerting downward pressure on the hand grip 9 while holding the hand grip 7 as shown in Fig. 1, will cause the entire width of the roller face to contact the walk and thus automatically position the cutter disc at right angles to the surface of the walk. Since the hand grip 9 is located at the end of the member 8 and is a considerable distance from the axis of the main portion 5 of the handle component, a considerable rocking movement of the hand grip 9 is required to effect a slight rocking of the cutter component and, therefore, the cutter is easily maintained in position. Furthermore, the raised position of the hand grip 9 positions it for comfortable grasping by the user and in a position from which maximum downward and forward pressure may be exerted with the arm of the user disposed in a substantially straight line generally parallel to the axial line of the main portion 5 of the handle. Still further, the downward pressure is applied directly to the walk engaging roller rather than to the cutter by reason of the parallel offsetting of the hand grip 9 and the roller. This latter feature, together with the wide roller face insures a better contact with the walk and additional sureness of positive rotation of the roller and cutter component. As a result, a lawn can be edged with a continuous forward movement of the present device in contrast to the usual back and forth movements which are required in lawn edging devices heretofore used.

While the foregoing specification has described and illustrated, by way of example, one embodiment of the invention, the invention is not to be deemed thereby to be limited to the exact construction so disclosed, and the invention embraces all such modifications in the parts and in the construction, combination and arrangement of parts as shall come within the purview of the appended claims.

I claim:

1. In a lawn edger, an elongated handle component provided with lawn edging means including a cutting disc and a roller fixed to one side of said disc rotatably mounted at one end thereof; said handle component in position of use extending from said one end diagonally upwardly and terminating at its other end in a first handle portion extending horizontally in a line parallel to a vertical plane containing the axis of said handle component and disposed at an elevation affording comfortable grasping by the hand of a user with the arm of the user extending generally downwardly; said handle component having at about its mid length an arm portion disposed in said vertical plane and at an acute angle to that portion of said handle component extending between said first handle portion and the juncture of said arm portion with said handle component; said arm portion when said handle component is in position of use being substantially vertical and at its free end having a second handle portion disposed at substantially the same elevation as said first handle portion and at right angles thereto.

2. A lawn edger as claimed in claim 1 in which the lawn edging means is disposed wholly at one side of said handle component with said cutting disc disposed adjacent to said handle component and in which said second handle portion is disposed at the same side of said handle component as said edging means.

JOHN J. BERES.

References Cited in the file of this patent

UNITED STATES PATENTS

| Number | Name | Date |
|---|---|---|
| 10,715 | Weymouth | Apr. 20, 1886 |
| 1,476,234 | Beeler | Dec. 4, 1923 |
| 1,714,817 | Randleman | May 28, 1929 |
| 2,480,002 | Danielson | Aug. 23, 1949 |
| 2,520,606 | McLoughlin | Aug. 29, 1950 |
| 2,560,882 | McCauley | July 17, 1951 |